(12) United States Patent
Atkinson et al.

(10) Patent No.: US 6,266,736 B1
(45) Date of Patent: *Jul. 24, 2001

(54) METHOD AND APPARATUS FOR EFFICIENT SOFTWARE UPDATING

(75) Inventors: Michael R. Atkinson, Irvine; Russell Auerbach, Long Beach, both of CA (US)

(73) Assignees: Sony Corporation, Tokyo (JP); Sony Trans Com, Inc., Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/791,933

(22) Filed: Jan. 31, 1997

(51) Int. Cl.[7] .................................................... G06F 12/00
(52) U.S. Cl. ............................................................. 711/103
(58) Field of Search .................................. 395/430, 712, 395/619; 711/103, 148; 717/11

(56) References Cited

U.S. PATENT DOCUMENTS

| | | | |
|---|---|---|---|
| 5,210,854 | * | 5/1993 | Beaverton et al. ................... 395/500 |
| 5,226,168 | * | 7/1993 | Kobayashi et al. ................... 395/800 |
| 5,361,343 | * | 11/1994 | Kosonocky et al. ................... 395/425 |
| 5,379,342 | * | 1/1995 | Arnold et al. ............................. 380/2 |
| 5,430,866 | * | 7/1995 | Lawrence et al. ....................... 395/575 |
| 5,437,018 | * | 7/1995 | Kobayashi et al. ................... 395/652 |
| 5,440,337 | * | 8/1995 | Henderson et al. .................. 348/144 |
| 5,481,701 | * | 1/1996 | Chambers, IV ....................... 395/600 |
| 5,530,847 | * | 6/1996 | Schieve et al. .................. 395/183.14 |
| 5,532,964 | * | 7/1996 | Cernea et al. ................... 365/189.09 |
| 5,701,492 | * | 12/1997 | Wadsworth et al. .................... 717/11 |
| 5,897,597 | * | 4/1999 | O'Daniel ................................. 701/29 |

\* cited by examiner

*Primary Examiner*—St. John Courtenay, III
(74) *Attorney, Agent, or Firm*—Blakely, Sokoloff, Taylor & Zafman LLP

(57) ABSTRACT

A method to update information including code and data in a non-volatile memory reliably and efficiently to avoid loss of information during the loading process and to minimize aircraft service downtime in an In-Flight Entertainment System (IFES). The non-volatile memory is partitioned into two sections: one section contains the currently valid information and the other is available for loading the new information. A section pointer is used to keep track of the currently valid section and to select the loading section. The new information is loaded to the selected loading section. A validation procedure is performed to determine if the loading is successful. When the loading of the new information is successfully completed, the section pointer is updated to point to the newly loaded section.

11 Claims, 4 Drawing Sheets

METHOD AND APPARATUS FOR EFFICIENT SOFTWARE UPDATING

BACKGROUND OF THE INVENTION

1. Field of the Invention

This invention relates to updating compressed information such as software codes in non-volatile memory. In particular, this invention relates to a method to load new software into a non-volatile memory while retaining the old software to prevent loss of information integrity in case of power failure.

2. Description of Related Art

Aircraft In-Flight Entertainment Systems (IFES) provide a variety of services to passengers during flight. Some examples of these services are music, radio programs, TV programs, video on demand, and games. Typical IFES involve a number of processors executing programs for specific tasks. Some programs also execute from and access data in non-volatile memory. Non-volatile memories containing program codes and data are usually implemented by flash electrically erasable programmable read only memories (EEPROMs) due to their popularity in recent years. In the following, the term "information" will be used to describe the codes and data.

Information including programs or data used in IFES may require several revisions during their life cycle. IFES services are highly technology-dependent; therefore when technology changes, the associated information may have to be revised accordingly. In addition, IFES services are also driven by the needs of customers. When customers' needs change, information has to be replaced by new versions reflecting these changes.

Because IFES information may be revised and/or updated quite frequently, it is desirable to update the information in the field rather than during regular maintenance periods. The updating should be as fast as possible to minimize system downtime during "switching over" period. Most importantly, the updating should not be compromised by other temporary system malfunctions such as power failure.

When the information is stored in the flash memory devices, revisions can be made by erasing the old information and loading the new information into the erased devices. Due to the in-circuit programmability of flash memory devices, the method of loading new information can be carried out in the field when the device is still powered. The new information can be transmitted to the field through any data communication method. However, the loading of the new information may take some time because the process of writing to the flash memory is relatively slow. During this time, temporary system malfunctions such as a power failure could interrupt the process. The result of this interruption could be disastrous if at the time of the power failure the old information has already been erased completely and the new information is only partially loaded into the flash memory. In this situation, when power is restored, the system boots up with only partially loaded new information. Needless to say, this scenario may lead to catastrophic consequences to the IFES.

It is, therefore, desirable to have a method to load the new information into the flash memory efficiently to reduce the loading time and at the same time to avoid compromising the information integrity during power failure.

SUMMARY OF THE INVENTION

A method of loading in the field a new version of information including code and data into a non-volatile memory device such as a flash memory, to replace a current version of information by a host processor. The non-volatile memory containing the information is partitioned into at least, but not limited to, two sections: one section contains the current information and one section contains the new information. A pointer located in the non-volatile memory is used to point to the current section. During program execution, only the current section is available to the processor. During the update process, the new information is loaded into the section that does not contain the current valid information. After the download and storing of the new information is complete, the new information is validated using a checksum algorithm and the pointer is then updated to point to the newly validated section.

To further improve the efficiency of the loading and reduce the size of the flash memory, the information is stored in the flash memory in compressed form. At boot-up, the processor decompresses and transfers the information to a random access memory (RAM) for program execution or data processing.

BRIEF DESCRIPTION OF THE DRAWINGS

The features and advantages of the present invention will become apparent from the following detailed description of the present invention in which.

DESCRIPTION OF THE INVENTION

The system and method of the present invention provides an efficient and secure way to load new information including code and data to flash memory in the field. In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily. In the following, the term "information" is used to describe codes and data. Codes are programs that can be executed by a processor. Data may include audio, images, and any information accessible to a processor.

Figure 1:
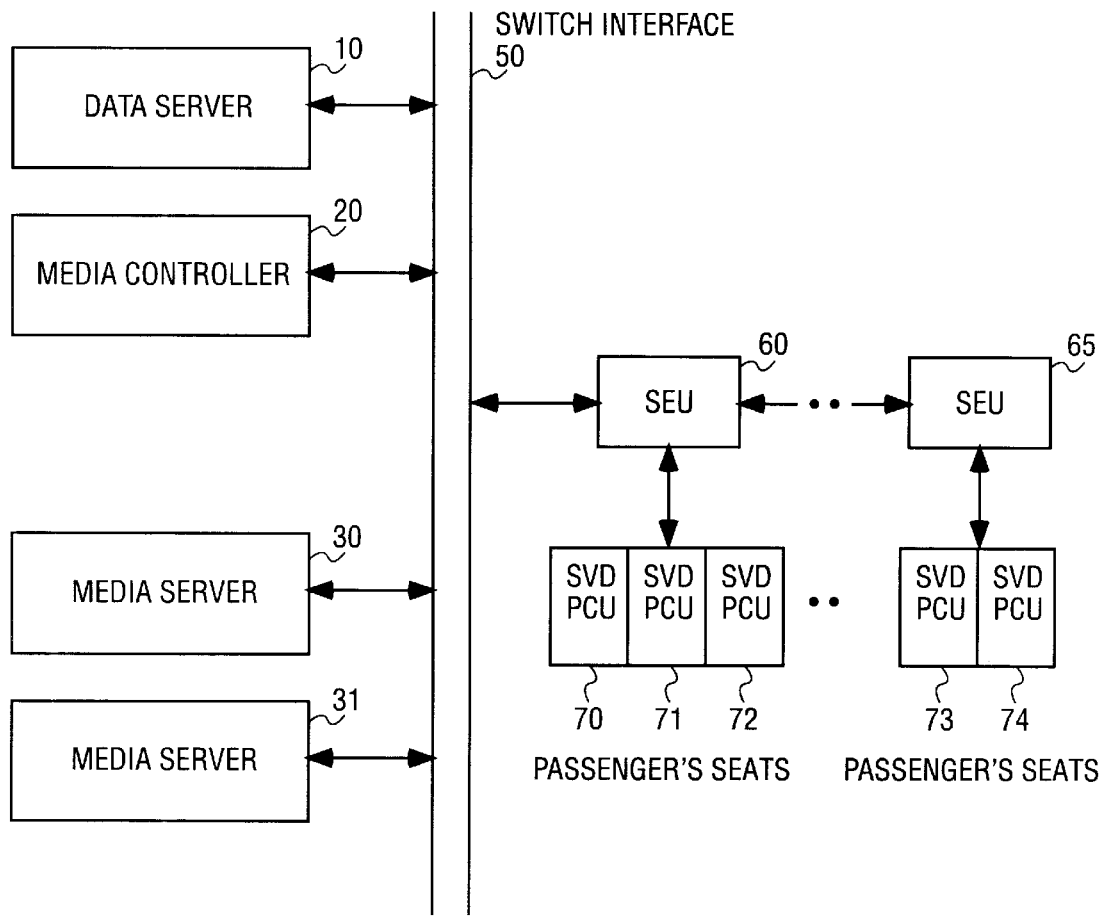
FIG. 1 is a block diagram illustrating the IFES environment of one embodiment of the present invention.

FIG. 1 is an illustration of the IFES environment for one embodiment of the present invention. The IFES includes a number of units and subsystems performing special tasks. Data server 10 stores and transmits data for video programs or games at a passenger's seat electronics unit. Media controller 20 schedules video or audio data streams, loads media contents to media servers, and controls trick mode operations such as requests for fast forward, rewind, pause or stop. Media servers 30 and 31 deliver video and audio data to the SEUs through switch interface 50. Switch interface 50 may includes a number of switching elements for data transmission such as Asynchronous Transfer Mode (ATM) switches. Switch interface 50 routes data to many units or subsystems in the IFES including a number of Seat Electronics Units (SEUs) such as SEUs 60 and 65. SEUs 60 and 65 provide control and data interface to input/output devices at the passenger's seats. Each SEU may accommodate a number of passenger's seats. For example, SEU 60 accommodates three passenger's seats 70, 71, and 72, SEU 65 accommodates passenger's seats 73 and 74. The input/output devices at each passenger's seat may include a seat video display (SVD), a passenger's control unit (PCU), an audio output, a pointing device such as a mouse or a trackball, a telephone handset, and a credit card reader, etc.

System configuration data is loaded onto data server 10. The system configuration data includes data that are related to the specific hardware and software used within the aircraft and the configuration of the hardware. Some examples of these configuration data are the contrast and brightness settings on the Seat Video Display (SVD), the number of Passenger Control Units (PCUs), the number of SVDs attached to the SEU, the number of seats, seat boxes, zones, servers and attendant stations and the specific seat arrangement. Data server 10 and Media Controller 20 each includes a microprocessor such as the Pentium® Intel microprocessor, some amount of Random Access Memory (RAM), system drive, and other peripheral devices. The present invention is applicable for subsystems or units that may require regular software updating such as Data server 10 and media controller 20. Due to the high availability requirement of the IFES, the updating of the software is usually done while the aircraft is in service, i.e., in flight, or during temporary stop-over. Under these scenarios, a new spreadsheet program may be updated during flight to provide the user the latest version, a new game or a new music program can be downloaded to add to or to replace old programs. Data on passengers' usage and/or billing data may also be collected. In other cases, the updating may be carried out to respond to modifications to the configuration of the aircraft such as seat addition, equipment removal, etc. The loading of an updated version of the information is carried out to minimize the aircraft service downtime and to maintain an uninterrupted entertainment service program to passengers. If service is necessary, authorized aircraft maintenance personnel may access the system by presenting some form of security check to a service port of the system. A security device such as a smart card reader or a keypad may be available for security check.

In one embodiment of the present invention, the processor executes the program or processing data from the RAM. The information, which may or may not be in a compressed form, is stored in a flash electrically erasable programmable read only memory ("flash") memory subsystem. There are at least two sections in the flash memory subsystem: one section stores the current version, referred to as the currently valid section, and one section stores the new version of information. The new information may represent the software updates from the software manufacturer for commercially available software, such as operating systems, spreadsheets programs, games modules, and Graphics User Interface (GUI) programs. The new information may also contain IFES specific programs such as video and audio user's interface and configuration data.

There is a section pointer that points to the currently valid section. When new information is required, the new information is loaded into a section other than the currently valid section. Only after the loading is determined to be successful through a validation step such as a checksum validation is the section pointer updated to point to the newly loaded section. Once the new information is successfully loaded, the information is decompressed, if it was compressed, and transferred to the RAM for access for execution or processing. At boot-up or re-start of the system, the processor also decompresses, if required, the compressed information stored in the currently valid section and transfers the decompressed information to the RAM. When there is temporary system malfunction, such as power failure, during the transfer and storing of the new version of information, the current version remains intact and can be used again upon restart until the complete loading process is successful.

Figure 2:
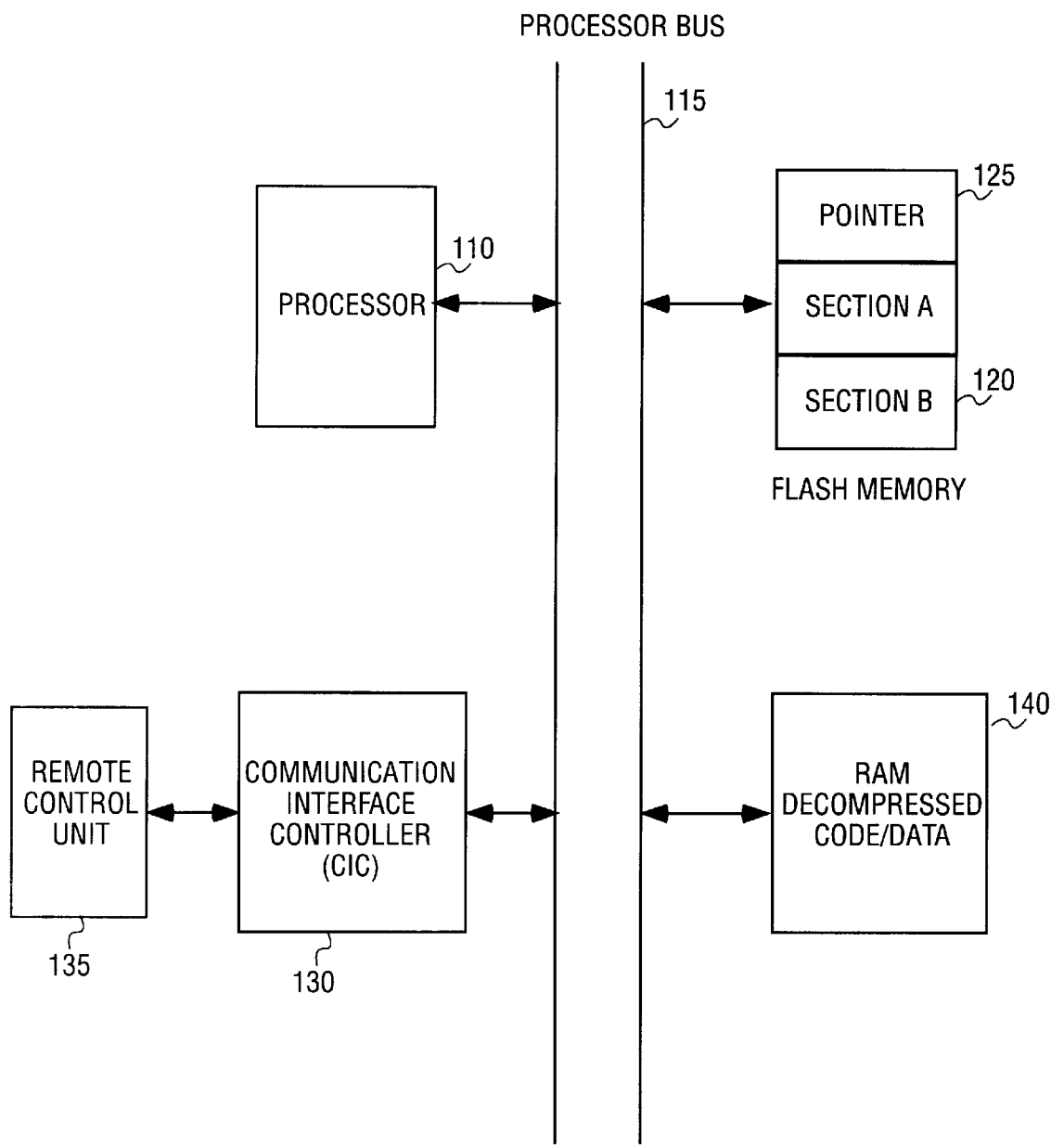
FIG. 2 is a block diagram illustrating one embodiment of the present invention.

FIG. 2 illustrates one embodiment of the present invention. Processor 110 is any processor that is capable of accessing a memory device. This may be a general-purpose microprocessor, a microcontroller, or a specialized processor with external interface capability. Processor 100 interfaces to flash memory 120 through processor bus 115. Processor bus 115 consists of conventional bus signals including address lines, data lines, and memory read/write control lines. Flash memory 120 is any flash memory device that can be erased and written to a number of times. Processor 110 also interfaces to communication interface controller (CIC) 130 which in turn interfaces to a central control unit (CCU) 135. In one embodiment, the CCU 135 is a remote processor which provides new codes/data to be loaded into flash memory 120 through a data communication interface.

Flash memory 120 is partitioned into two sections: section A and section B. Each section stores a version of the information. One section stores the current information and one section stores the new information. The role of each section reverses every time new information is loaded. At any time, one section is designated currently valid section. Flash memory 120 also contains pointer 125 although it is not necessary for pointer 125 to reside in flash memory 120. Pointer 125 is a data structure that is used to enable processor 110 to execute code or locate data at the valid address of the currently valid section. An example of such a data structure is the starting address of the currently valid section. When the starting address of the currently valid section is available, processor 110 simply jumps to that location to begin program execution. If it is a data section, then the starting address can be used by processor 110 as a base address or index address in accessing the data in the section. Regardless of whether the section is a code or data section or both, processor 110 obtains information provided by pointer 125 before accessing the currently valid section. Pointer 125, therefore, is updated only when it is guaranteed that the new information has already been successfully loaded into flash memory 120.

Since flash memory 120 contains at least two versions of information, it is necessary that its size be sufficient large to store both (or more) versions, especially when the new version may be larger than the current version.

CIC 130 provides communication interface to a variety of remote processors or systems. CCU 135 is one example of such a remote processor. CCU 135 sends the new information to be updated through some communication medium such as a modem. Processor 110 obtains the new information from CCU 135 through CIC 130. Processor 110 then loads the new information into flash memory 120.

In many situations, the size of the code or data may be large and the loading of information into flash memory may take some time to complete. To reduce the loading time and to reduce the flash memory size, it is desirable to compress the information stored in the flash memory. Another advantage of compressed information being stored in flash memory is that the initial loading information into flash memory is sped up during the manufacturing process. When program execution begins, processor 110 begins executing its "boot code" which decompresses the information from the flash memory and transfers the decompressed information to random access memory (RAM) 140. Thereafter, processor 110 validates the decompressed information with a checksum algorithm. If the newly decompressed code is valid, Processor 110 begins executing that code or fetching that data.

Figure 3:
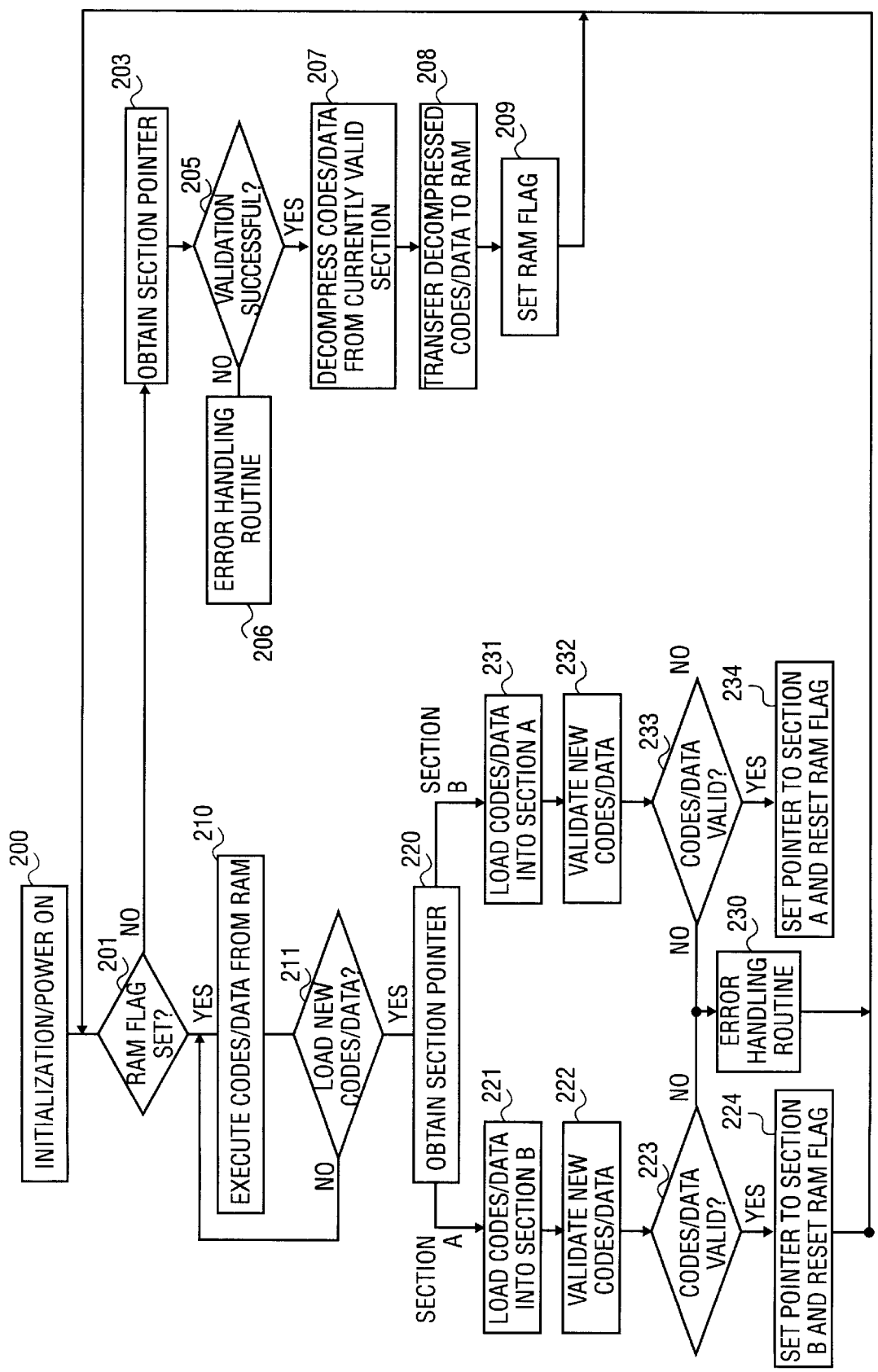
FIG. 3 is a flowchart describing steps in the loading of new codes/data into the flash memory in one embodiment of the present invention.

FIG. 3 is a flowchart illustrating one embodiment of the process for loading new information into flash memory. In Step 200, the initialization takes place at boot-up or restart. A RAM flag is reset to indicate that the RAM has not been loaded with the decompressed information. At step 201, a determination is made to determine if the RAM flag is set. If the RAM flag is not set, the RAM does not contain decompressed information. It is then necessary to transfer the information to the RAM. At step 203, the section pointer is obtained to determine the currently valid section containing valid information. At step 205, a determination is made to check if the validation is successful. This validation may include the verification of the checksum information in the configuration data. The configuration data may contain information unique to the particular configuration of the IFES, e.g., the contrast and brightness settings on the Seat Video Display. If the validation is successful, control passes to step 207; otherwise, control passes to step 206 for error handling. The host processor then performs decompression on the compressed information stored at the currently valid section in step 207. In step 208, the decompressed information is transferred to the RAM. After the transfer is completed, the RAM flag is set and control returns to step 201.

If the RAM flag is set signifying that the RAM contains valid information, control passes to step 210. In step 210, the processor executes code or processes data from the RAM. At an appropriate time, or if interrupted, the processor is asked to load the new information. In step 211, a determination is made if the loading process is ready to be performed. For example, a new version may not be effective after a certain time when other system parameters are correspondingly updated. If the loading process is not ready to be performed, the processor goes back to step 210 to continue code execution or data processing. If the new information is to be loaded, the processor obtains the section pointer, at step 220, to determine which section is currently valid. If section A is currently valid, control passes to step 221. If section B is currently valid, control passes to step 231.

In step 221, the processor loads compressed new information into section B of the flash memory. During this time, the RAM flag is still set and the section pointer is still pointing to section A. Therefore, if there is a temporary system malfunction like a power failure during the loading of compressed new information, at step 221, upon system boot-up or re-start, the section pointer and section A remain intact and the processor can proceed with the current version before updating with the compressed new information.

If there is no power failure during the loading process and the loading process is completed normally, the processor validates the new codes/data in step 222. The validation step typically consists of any necessary validation procedures such as error checking and identity verification. In the present embodiment, a checksum is performed on the loaded information. In step 223, a determination is made if the loaded information pass the validation check. If there is an error, control passes to an error handling routine in step 230. This error handling routine may consist of a request for re-transmission of information, error messages to originating processor, or a request for re-loading. If there is no error and the validation process is successful, the section pointer is updated to point to section B and the RAM flag is reset in step 224. The setting of pointer and the resetting of RAM flag are done at the same time to ensure the integrity of the testing of the two conditions.

Similar steps are taken if the section pointer points to section B. In step 231, the processor loads new compressed codes/data into section A of the flash memory. During this time, the RAM flag is still set and the section pointer still points to section B. Therefore, if there is a system malfunction such as a power failure during the loading of new compressed information at step 231, upon system boot-up or re-start, the section pointer and section B remain intact and the processor can proceed with the current version before the update. If there is no power failure during the loading and the loading is completed normally, the processor validates the new information in step 232. In step 233, a determination is made if the loaded information passes the validation check. If there is any error, control passes to an error handling routine in step 230. If there is no error and the validation is successful, then the section pointer is updated to point to section A and the RAM flag is reset in step 234.

By deferring the updating of the section pointer until after the loading of new codes/data is successful, the integrity of program execution or data processing is maintained.

The above discussion refers to one embodiment in which the two versions of the information are contained in the same flash memory device. Another embodiment can be practiced using a physical division of the flash memory subsystem into separate flash memory devices.

Figure 4:
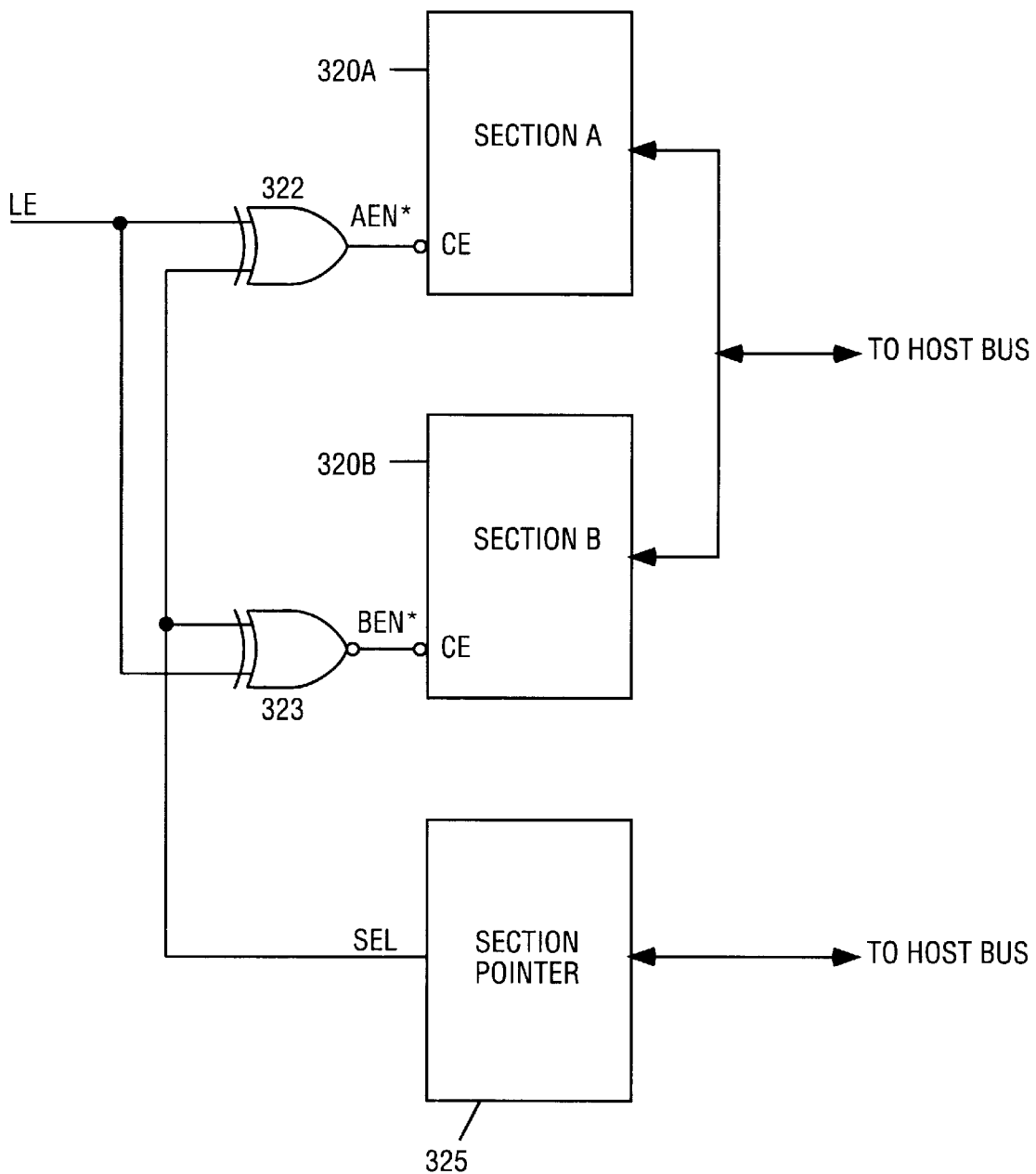
FIG. 4 illustrates another embodiment of the present invention.

Referring to FIG. 4, two separate flash memory devices contain the two versions of codes/data. Flash memory devices 320A and 320B correspond to sections A and B, respectively. The address lines of flash memory device 320A are tied to those of flash memory device 320B. The data lines of flash memory device 320B are also tied to those of flash memory device 320B. In other words, both devices correspond to the same address. However, at any time, at most only one device is selected to respond to the host processor. The selection of each flash memory device is accomplished by asserting a LOW logic level at the corresponding chip enable (CE*) line. In FIG. 4, the chip enable lines of flash memory devices A and B are referred to as AEN* and BEN*, respectively. When a flash memory device is not selected, i.e., when its CE* line is at the logic HIGH level, the device is isolated from the other device which is connected to it. The AEN* and BEN* signals are generated from a logic circuit such that at any time, at most one of AEN* and BEN* is asserted LOW so that at most one of the flash memory devices is selected. To ensure this, the AEN* and BEN* are complementary so that both of them cannot be LOW at the same time. When there are more than two flash memory devices connected in this manner, their corresponding CE* lines may be connected to the output lines of a decoder to ensure that at most one of the lines is asserted LOW. The use of a hardware decoder to select a device from a group of devices tied together is well known in the art and will not be described further.

Section pointer 325 is implemented as a non-volatile, programmable, one-bit indicator. This one-bit indicator can be one signal line, referred to as the SEL signal, output from a flash memory device or any other non-volatile programmable device. Section pointer 325 is accessible to the host processor so that the SEL signal can be set or reset by the host processor accordingly. According to the present embodiment, when SEL is reset to a LOW level (logic 0) and no loading is desired, flash memory device 320A containing section A is enabled and flash memory device 320B containing section B is disabled. When SEL is set to a HIGH level (logic 1) and no loading is desired, flash memory device 320B containing section B is enabled and flash memory device 320A containing section A is disabled. It is readily recognized that the above logic is reversed if the active level of the enable input is reversed.

When a flash memory device is enabled, the host processor can access the device as normal, including reading, erasing, and writing. Loading a new version of codes/data is controlled by the Load Enable (LE) signal and is set or reset by the host processor. The LE signal may be one bit corresponding to a specified memory address corresponding to a memory-mapped or input/output-mapped input/output (I/Q) interface adapter, or it may be one bit from an port. The LE signal is active TRUE, i.e., if LE is HIGH, loading is desired, if LE is LOW, loading is not desired.

The selection of the flash memory device works as follows: If loading is not desired, the enabled device is the one selected by section pointer 25, i.e., the device containing current version. When loading is desired, the enabled device is the one NOT selected by the section pointer, i.e., the device containing invalid code. This enabled device will be erased and loaded with the new version of the codes/data. After the loading is complete and the new codes/data are successfully validated, the section pointer is complemented to point to this newly loaded version, and the LE is de-asserted (i.e., reset to logic 0).

The enabling of flash memory devices 320A and 320B is performed by AEN* and BEN*. AEN* and BEN* are generated according to the logic equations derived from the following truth table:

| LE | SEL | AEN* | BEN* |
|----|-----|------|------|
| 0  | 0   | 0    | 1    |
| 0  | 1   | 1    | 0    |
| 1  | 0   | 1    | 0    |
| 1  | 1   | 0    | 1    |

The above truth table reflects the following rule: When loading is not desired (LE is LOW), then AEN* is the same as SEL, reflecting what the section pointer points to. When loading is desired (LE is HIGH), then AEN* is the opposite of the SEL, reflecting that the selected device (for loading) is not the same one as pointed to by the section pointer.

The above truth table can be realized by an Exclusive-OR gate 322 and an Equivalence gate (or Exclusive-NOR gate) 323. The Exclusive-OR gate and Equivalence gate are complementary. Alternatively, an AND-OR implementation can be obtained as follows:

$AEN^*=LE'.SEL+LE.SEL'$ $BEN^*=LE'.SEL'+LE.SEL$ where LE' and SEL' are the complements of LE and SEL, respectively.

One advantage of this embodiment is that the host processor does not need to keep track of the specific address of the flash memory devices because they all correspond to the same address. The section pointer essentially acts to select the proper device directly.

The logic circuit to generate AEN* and BEN* may be expanded to cover more than two flash memory devices. This is especially relevant if there is a need to have multiple versions of information available at the same time. By loading proper select codes to section pointer 325, the host processor can access to the suitable flash memory device.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. In an In-Flight Entertainment System (IFES) having a processor coupled to a non-volatile memory, a method for loading new information into the non-volatile memory in order to replace a current information, the method comprising:

partitioning the non-volatile memory into at least two sections, a first section of the at least two sections containing the current information;

maintaining a section pointer for use by the processor for accessing the non-volatile memory and selecting a second section of the at least two sections, the second section not containing the current information;

loading the new information into the second section of the at least two sections as indicated by the maintained section pointer;

validating the new information after it is loaded into the second section;

updating the section pointer to indicate that current information is stored in the second section after the loaded new information is validated, wherein the section of the first and second sections not containing the current information is used for loading subsequent new information to replace the current information.

2. The method as set forth in claim 1, wherein the at least two sections are addressed by the processor using a common address, the section pointer utilized to enable a section of the at least two sections to be accessed by the processor.

3. The method as set forth in claim 1, wherein loading further comprises:

determining if a random access memory (RAM) flag is set, the RAM flag indicating that new information has been transferred to a RAM; and if the RAM flag is set,
      determining if the new information is ready to be loaded, and
      loading the new information into the second section if the new information is ready to be loaded, and if the RAM flag is not set, transferring the new information from the non-volatile memory to the RAM.

4. The method as set forth in claim 1, further comprising:

compressing the new information prior to loading; and decompressing the compressed information to produce decompressed information and transferring the decompressed information to a RAM for access by the processor.

5. The method as set forth in claim 1, wherein validating comprises checking for a checksum error.

6. An in flight entertainment system (IFES) comprising:

a processor;

a non-volatile memory coupled to the processor, said non-volatile memory partitioned into at least two sections;

a section pointer coupled to the non-volatile memory and the processor, said section pointer for use by the processor for accessing the first non-volatile memory and selecting a second section of the at least two section, said second section not containing the current information;

said processor configured to control the loading of new information into the non-volatile memory in order to replace a current information in order to decrease aircraft service downtime by loading the new information into the second section of the at least two sections as indicated by the maintained section pointer, validating said new information after it is loaded into the second section, and updating said section pointer to indicate that current information is stored in the second section after said loaded new information is validated, wherein the section of the first and second sections not containing the current information is used for loading subsequent new information to replace the current information.

7. The system as set forth in claim 6 wherein the at least two sections are addressed by the processor using a common address, said section pointer utilized to enable a section of the at least two sections to be accessed by the processor.

8. The system as set forth in claim 6, wherein the processor is configured to load by;

determining if a random access memory (RAM) flag is set, the RAM flag indicating that new information has been transferred to a RAM; and if the RAM flag is set,
determining if the new information is ready to be loaded, and
loading the new information into the second section if the new information is ready to be loaded, and if the RAM flag is not set, transferring the new information from the first non-volatile memory to the RAM.

9. The system as set forth in claim 6, wherein the processor is further configured to:
compress the new information prior to loading; and
decompress the compressed information to produce decompressed information and transferring the decompressed information to a RAM for access by the processor.

10. The system as set forth in claim 6, wherein the at least two sections are stored in a single non-volatile memory device.

11. The system as set forth in claim 6, wherein the at least two sections are stored in a plurality of separate non-volatile memory devices.

* * * * *